(12) United States Patent
Zhang

(10) Patent No.: US 12,149,096 B2
(45) Date of Patent: Nov. 19, 2024

(54) ACTIVE ELECTROMAGNETIC SHIELDING FOR HIGH POWER DYNAMIC WIRELESS CHARGING AND RELATED SYSTEMS, METHODS, AND DEVICES

(71) Applicant: Battelle Energy Alliance, LLC, Idaho Falls, ID (US)

(72) Inventor: Bo Zhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 191 days.

(21) Appl. No.: 17/753,533

(22) PCT Filed: Sep. 10, 2020

(86) PCT No.: PCT/US2020/050067
§ 371 (c)(1),
(2) Date: Mar. 7, 2022

(87) PCT Pub. No.: WO2021/050642
PCT Pub. Date: Mar. 18, 2021

(65) Prior Publication Data
US 2022/0393510 A1 Dec. 8, 2022

Related U.S. Application Data

(60) Provisional application No. 62/970,862, filed on Feb. 6, 2020, provisional application No. 62/898,784, filed on Sep. 11, 2019.

(51) Int. Cl.
*H02J 50/12* (2016.01)
*B60L 53/12* (2019.01)
(Continued)

(52) U.S. Cl.
CPC ............. *H02J 50/12* (2016.02); *B60L 53/12* (2019.02); *H02J 50/05* (2016.02); *H02J 50/40* (2016.02); *H02J 50/70* (2016.02)

(58) Field of Classification Search
CPC .. H02J 50/12; H02J 50/05; H02J 50/40; H02J 50/70; H02J 2310/48; H02J 50/60;
(Continued)

(56) References Cited

U.S. PATENT DOCUMENTS 8,008,888 B2 8/2011 Oyobe et al.
8,946,938 B2 2/2015 Kesler et al.
(Continued)

FOREIGN PATENT DOCUMENTS

| EP | 3282459 A1 | 2/2018 |
|---|---|---|
| GB | 2497824 A | 6/2013 |
| WO | 2011/046374 A2 | 4/2011 |

OTHER PUBLICATIONS

Choi et al., "Generalized Active EMF Cancel Methods for Wireless Electric Vehicles," IEEE Transaction on Power Electronics, vol. 29, Issue 11, Nov. 2014, pp. 5770-5783.
(Continued)

*Primary Examiner* — Lincoln D Donovan
*Assistant Examiner* — Alex W Lam
(74) *Attorney, Agent, or Firm* — TraskBritt

(57) ABSTRACT

Active electromagnetic shielding for dynamic high power wireless charging and related electrified roadway systems, method, and wireless power transmitters is disclosed. A wireless power transmitter includes a first canceling coil offset from a power transmission coil, a second canceling coil offset from the power transmission coil, and circuitry electrically connected to the first canceling coil and the second canceling coil. The circuitry is configured to deliver canceling currents to the first canceling coil and the second canceling coil to destructively interfere with portions of electromagnetic fields generated by the power transmission coil.

20 Claims, 9 Drawing Sheets

(51) Int. Cl.
  *H02J 50/05* (2016.01)
  *H02J 50/40* (2016.01)
  *H02J 50/70* (2016.01)

(58) Field of Classification Search
  CPC ........ B60L 53/12; B60L 5/005; H01F 27/289;
         H01F 27/346; H01F 38/14; H01F 27/38;
         Y02T 10/70; Y02T 10/7072; Y02T 90/14
  See application file for complete search history.

(56) References Cited

U.S. PATENT DOCUMENTS

| | | |
|---|---|---|
| 9,306,635 B2 | 4/2016 | Kurs et al. |
| 9,707,852 B2 | 7/2017 | Kautz |
| 9,923,406 B2 | 3/2018 | Percebon et al. |
| 10,080,318 B2 | 9/2018 | Ricci |
| 10,128,698 B2 | 11/2018 | Lewis et al. |
| 10,245,963 B2 | 4/2019 | Ansari et al. |
| 2010/0081483 A1 | 4/2010 | Chatterjee et al. |
| 2012/0262002 A1 | 10/2012 | Widmer et al. |
| 2013/0119928 A1 | 5/2013 | Partovi |
| 2013/0154553 A1 | 6/2013 | Steele |
| 2015/0145341 A1* | 5/2015 | Chiyo .................... H02J 50/10  336/170 |
| 2015/0244181 A1 | 8/2015 | Kagami et al. |
| 2015/0246614 A1 | 9/2015 | Dames et al. |
| 2015/0371768 A1 | 12/2015 | Graham et al. |
| 2015/0380154 A1 | 12/2015 | Kagami et al. |
| 2016/0020019 A1 | 1/2016 | Kagami et al. |
| 2016/0052398 A1 | 2/2016 | Richards |
| 2016/0068070 A1 | 3/2016 | Huang et al. |
| 2016/0144727 A1 | 5/2016 | Tokura et al. |
| 2016/0285317 A1 | 9/2016 | Maniktala |
| 2016/0347188 A1 | 12/2016 | Nakahara et al. |
| 2016/0380469 A1* | 12/2016 | Lethellier ............... H02J 50/10  320/108 |
| 2017/0126059 A1 | 5/2017 | Takahashi et al. |
| 2017/0136896 A1 | 5/2017 | Ricci |
| 2017/0222490 A1* | 8/2017 | Boys ...................... H02J 50/12 |
| 2018/0040416 A1 | 2/2018 | Lestoquoy |
| 2018/0090956 A1 | 3/2018 | Graham et al. |
| 2018/0090974 A1 | 3/2018 | Elkayam et al. |
| 2018/0294683 A1 | 10/2018 | Sakamoto et al. |
| 2019/0035543 A1 | 1/2019 | Suzuki et al. |
| 2019/0190317 A1 | 6/2019 | Wang et al. |
| 2020/0126717 A1 | 4/2020 | Nakamura |

OTHER PUBLICATIONS

International Search Report for Application No. PCT/US2020/050067, mailed Nov. 30, 2020, 2 pages.
Written Opinion of the International Searching Authority, mailed Nov. 30, 2020, 6 pages.
Zhang et al., "Concept Design of Active Shielding for Dynamic Wireless Charging of Light-duty EV," 2020 IEEE Transportation Electrification Conference & Expo (ITEC), Chicago, IL, USA, 2020, pp. 844-850, doi: 10.1109/ITEC48692.2020.9161606.

* cited by examiner

ACTIVE ELECTROMAGNETIC SHIELDING FOR HIGH POWER DYNAMIC WIRELESS CHARGING AND RELATED SYSTEMS, METHODS, AND DEVICES

CROSS-REFERENCE TO RELATED APPLICATIONS

This application is a national phase entry under 35 U.S.C. § 371 of International Patent Application PCT/US2020/050067, filed Sep. 10, 2020, designating the United States of America and published as International Patent Publication WO 2021/050642 A1 on Mar. 18, 2021, which claims the benefit of the filing dates under Article 8 of the Patent Cooperation Treaty of U.S. Provisional Patent Application Ser. No. 62/970,862, filed Feb. 6, 2020, for "Active Electromagnetic Shielding for High Power Dynamic Wireless Charging and Related Systems, Methods, and Devices;" and U.S. Provisional Patent Application Ser. No. 62/898,784, filed Sep. 11, 2019, for "Electromagnetic Shield Design for High Power Wireless Charging of Electric Vehicles and Related Systems, Devices, and Methods;" the disclosure of each of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The present disclosure relates generally to electromagnetic shielding for wireless power systems, and more specifically to active electromagnetic field canceling in wireless power systems such as dynamic inductive power transfer (dIPT) systems.

BACKGROUND

Dynamic wireless power transfer, or equivalently dynamic inductive power transfer (dIPT), is a newly developed convenient, flexible, and state-of-the-art wireless charging technology with the potential capability of enabling fully automated in-motion charging for wirelessly chargeable vehicles traveling in electrified roadways.

BRIEF SUMMARY

In some embodiments, a wireless power transmitter includes a first canceling coil offset from a power transmission coil, a second canceling coil offset from the power transmission coil, and circuitry electrically connected to the first canceling coil and the second canceling coil. The circuitry is configured to deliver canceling currents to the first canceling coil and the second canceling coil to destructively interfere with portions of electromagnetic fields generated by the power transmission coil.

In some embodiments, an electrified roadway system includes a plurality of wireless power transmitters. Each wireless power transmitter of the plurality of wireless power transmitters includes a power transmission coil and a plurality of canceling coils. The power transmission coil is configured to inductively couple to and provide wireless power to receive coils of wirelessly chargeable vehicles. The plurality of canceling coils are configured to generate canceling electromagnetic fields to destructively interfere with portions of electromagnetic fields generated by the power transmission coil.

In some embodiments, a method of assembling a wireless power transmitter includes positioning a power transmission coil, positioning a first canceling coil proximate to the power transmission coil, positioning a second canceling coil proximate to the power transmission coil, and electrically connecting circuitry to the first canceling coil and the second canceling coil. The circuitry is configured to excite the first canceling coil and the second canceling coil out of phase with a transmit current of the power transmission coil.

In some embodiments, a method of operating a wireless power transmitter includes providing a transmit current to a power transmission coil to transmit power to a receive coil of a wireless power receiver. The method also includes providing a first canceling current to a first canceling coil laterally offset from the power transmission coil, the first canceling current out of phase with the transmit current. The method further includes providing a second canceling current to a second canceling coil laterally offset from the power transmission coil. The second canceling current is out of phase with the transmit current.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
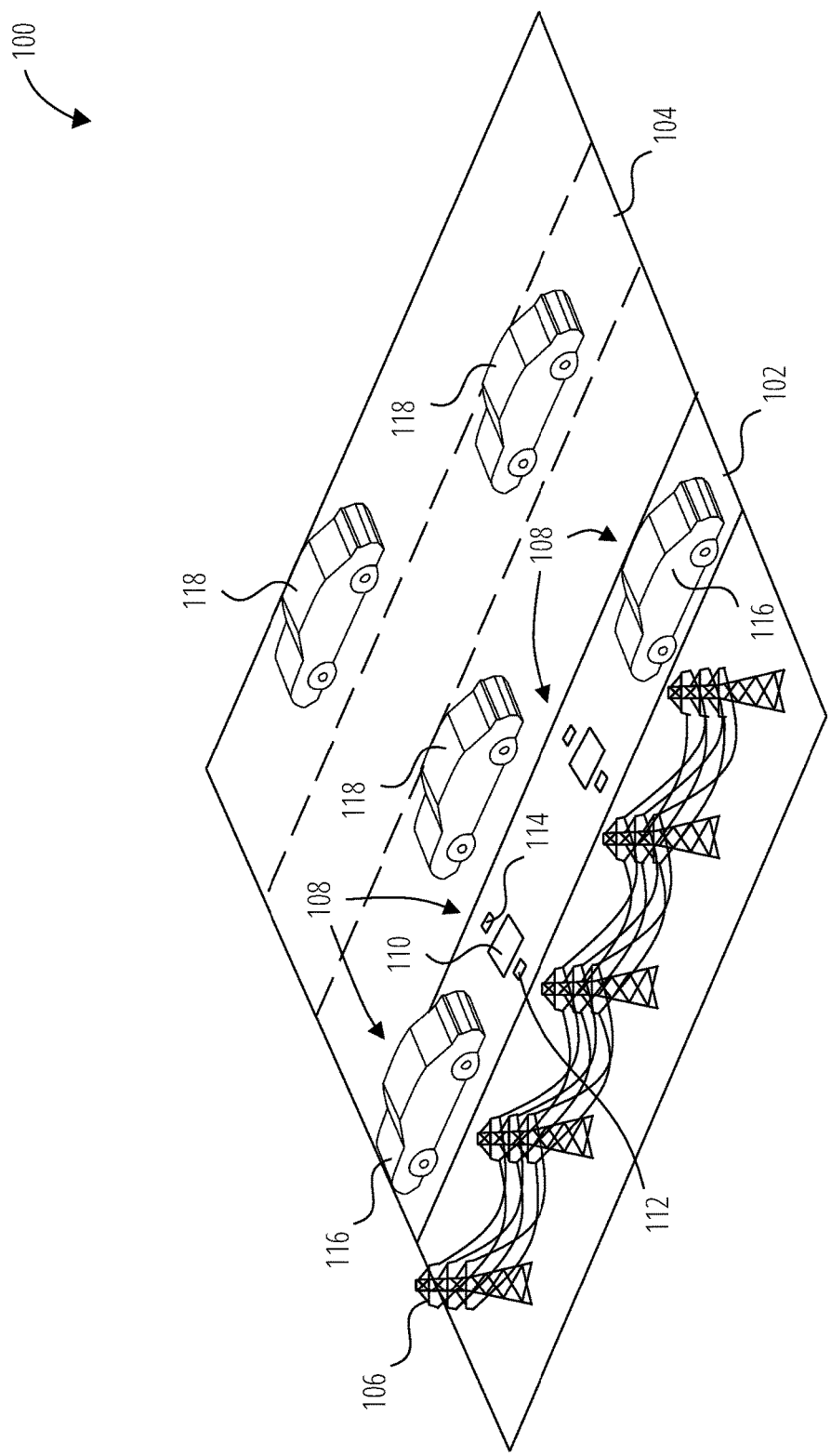
FIG. 1 is a perspective view of a roadway system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

For charging power up to the 100 kilo Watt (100 kW) or 200 kW levels for light duty electric vehicles (LDEVs), electromagnetic (EM) safety in regard to human health surrounding dIPT systems becomes a concern. Passive shielding solutions (e.g., using ferrite shielding) may improve EM safety in stationary 100 kW to 200 kW level wireless charging. Due to the high cost of ferrite for dIPT systems, however, costs for producing wireless power transmitters may be decreased if less ferrite were used (e.g., on the ground-side but also on the vehicle side in some instances) for shielding solutions.

Different from stationary inductive power transfer (IPT), in-motion wireless charging is a feature of dIPT. For LDEVs dIPT offers a wireless charging solution for fully autonomous driving. For example, dIPT offers the potential of electric vehicles (EVs) to travel relatively long distances without stops to recharge and increasing the size of the on-board battery, as compared to stationary IPT solutions. As a result, energy storage capacity for LDEVs may be reduced in dIPT systems as compared to stationary IPT systems.

High power charging (e.g., 100 kW or greater) enables less of the roadway to be electrified as compared to low power charging in order to meet vehicle energy requirements. In other words, the more power received by an EV as it passes each wireless charging station, the fewer wireless charging stations may be used along the roadway. As a general rule, the high the power of charging, the less ground-side infrastructure may be used, which may result in lower equipment and maintenance costs.

Disclosed herein is active shielding of wireless power transmitter coils (e.g., using canceling coils). This active shielding may be used as a supplement to passive shielding such as ferrite shielding. Embodiments disclosed herein may be used in dIPT systems such as for LDEVs.

Figure 2:
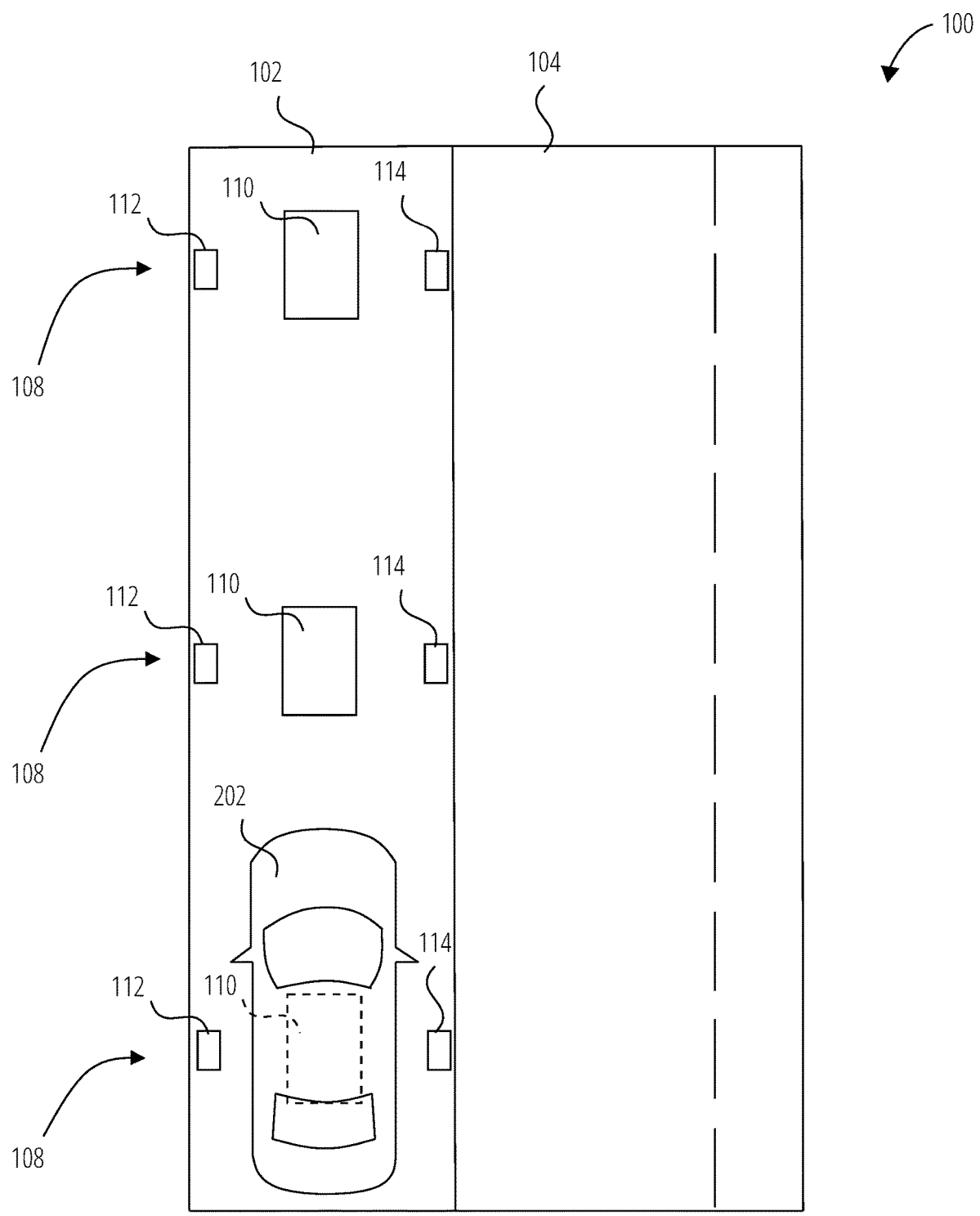
FIG. 2 is a plan view of a portion of the roadway system of FIG. 1.

FIG. 1 and FIG. 2 are views of a roadway system 100, according to some embodiments. FIG. 1 is a perspective view of the roadway system 100. FIG. 2 is a plan view of a portion of the roadway system 100.

Referring to FIG. 1 and FIG. 2 together, the roadway system 100 includes an electrified roadway 102 and a non-electrified roadway 104. The electrified roadway 102 may include wireless power transmitters 108 along the electrified roadway 102. Each of the wireless power transmitters 108 may include a power transmission coil 110, a first canceling coil 112, and a second canceling coil 114. The power transmission coil 110 is configured to inductively couple to and provide wireless power to receive coils of wirelessly chargeable vehicles 116 (e.g., the wirelessly chargeable vehicle 202) in the electrified roadway 102. By way of non-limiting example, the power transmission coil 110 may provide high frequency resonant charging currents. The first canceling coil 112 is spaced laterally from the power transmission coil 110 and the second canceling coil 114 is spaced laterally from the power transmission coil 110 opposite from first canceling coil electrified roadway 102 across the power transmission coil 110. By way of non-limiting example, the first canceling coil 112 and the second canceling coil 114 may be positioned at the edges of a lane of the electrified roadway 102, as illustrated in FIG. 1 and FIG. 2. Centers of the first canceling coil 112 and the second canceling coil 114 may be positioned at least 0.4 meters from the power transmission coil 110, without limitation. Also, centers of the first canceling coil 112 and the second canceling coil 114 should be spaced at a distance from the center of the power transmission coil 110 that is greater than or equal to a width (in a vehicle's side-to-side direction) of the power transmission coil 110.

Although only two canceling coils (i.e., first canceling coil 112 and second canceling coil 114) are illustrated for each of the wireless power transmitters 108 in FIG. 1 and FIG. 2, a number of canceling coils (e.g., the first canceling coil 112, the second canceling coil 114) of each of the wireless power transmitters 108 may be any positive even number (e.g., 2, 4, 6, . . . ).

The electrified roadway 102 and the non-electrified roadway 104 are configured to generate canceling electromagnetic fields to destructively interfere with portions of electromagnetic fields generated by the power transmission coil 110. By way of non-limiting example, the first canceling coil 112 and the second canceling coil 114 may be electrically connected in series with the power transmission coil 110, but excited by currents in a reverse direction from that of the power transmission coil 110 to generate electromagnetic fields of opposite magnitudes. Also by way of non-limiting example, canceling currents provided to the first canceling coil 112 and the second canceling coil 114 may be out of phase (e.g., substantially 180 degrees out of phase) with a transmit current provided to the power transmission coil 110. The first canceling coil 112 and the second canceling coil 114 are smaller coils than the power transmission coil 110. The first canceling coil 112 and the second canceling coil 114 may generate reverse magnetic fields simultaneously to magnetic fields generated by the power transmission coil 110 to minimize magnetic field emissions.

Wirelessly chargeable vehicles 116 such as wirelessly chargeable vehicle 202 may travel in the electrified roadway 102 and vehicles 118 (which may include non-wirelessly chargeable vehicles and wirelessly chargeable vehicles 116) may travel in the non-electrified roadway 104. In some embodiments, one or more of the wirelessly chargeable vehicles 116 may include LDEVs. When wirelessly chargeable vehicles 116 pass by the wireless power transmitters 108, the power transmission coil 110, the first canceling coil 112, and the second canceling coil 114 are activated simultaneously and alternatively to charge batteries of the in-motion wirelessly chargeable vehicles 116.

As previously discussed, during the wireless charging process, generated electromagnetic fields may cause safety issues (e.g., for drivers of the wirelessly chargeable vehicles 116). The first canceling coil 112 and second canceling coil 114 may generate canceling electromagnetic fields that cancel a portion of electromagnetic fields generated by the power transmission coil 110 to reduce the severity of these safety issues. For example, the first canceling coil 112 and the second canceling coil 114 may generate reverse magnetic fields that are reverse to main fields from the power transmission coil 110 to reduce stray magnetic field emissions.

Figure 3:
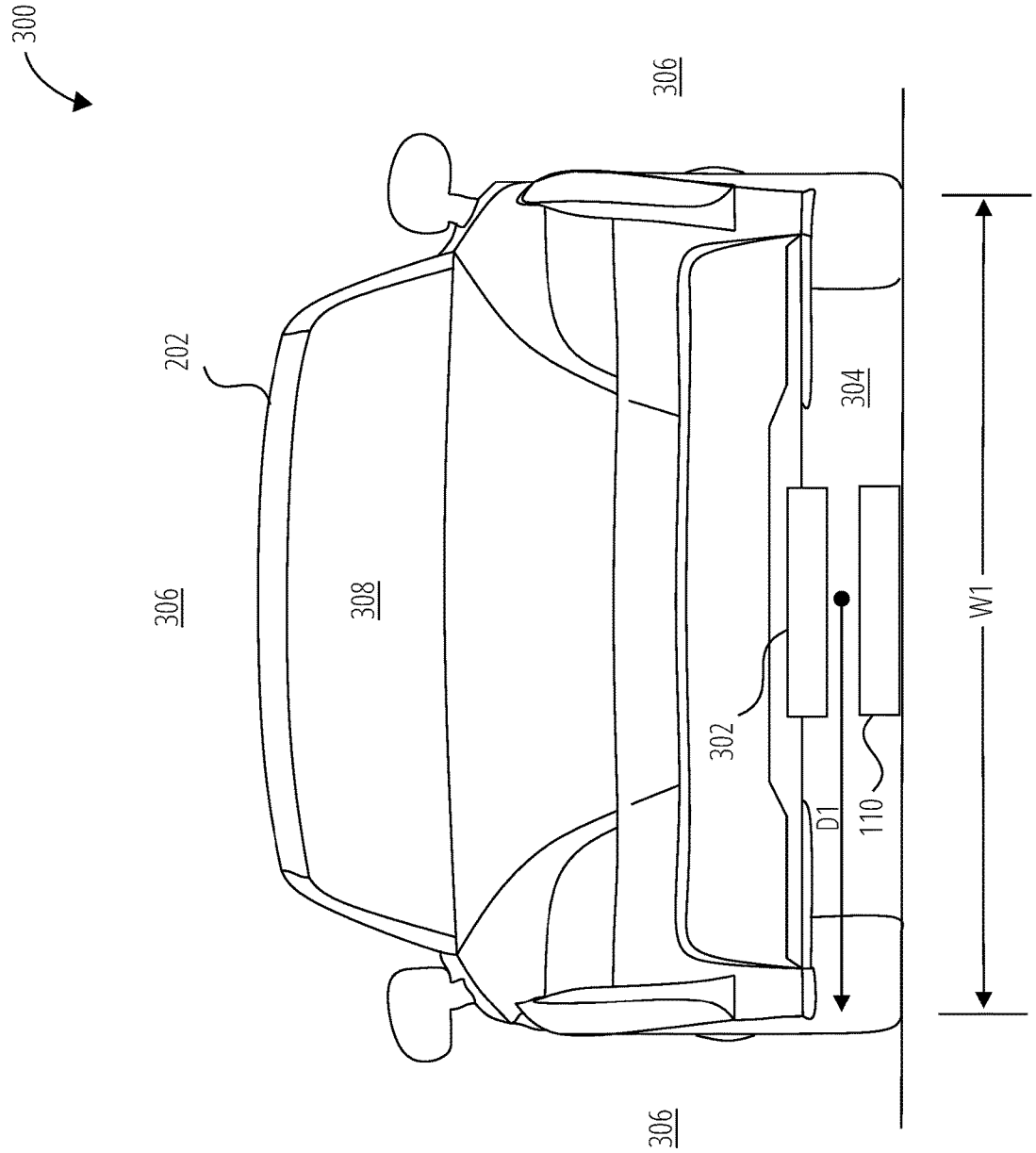
FIG. 3 is a front view of a wireless power system, according to some embodiments.

FIG. 3 is a front view of a wireless power system 300, according to some embodiments. The wireless power system 300 includes the wirelessly chargeable vehicle 202 of FIG. 2 and the power transmission coil 110 of FIG. 1 and FIG. 2. The wireless power system 300 also includes a receive coil 302 of the wirelessly chargeable vehicle 202. The power transmission coil 110 is configured to provide wireless power to the receive coil 302.

During transmission of wireless power from the power transmission coil 110 to the receive coil 302, electromagnetic fields may be emitted. Magnitudes of these electromagnetic fields may be regulated to improve safety of wireless power systems such as the wireless power system 300 of FIG. 3. For example, the Society of Automotive Engineers International (SAE International) regulates electromagnetic fields in an under vehicle region 304, an over vehicle region 306, and an inside vehicle region 308 in a specification defined in SAE J2954. SAE J2954 also defines a maximum allowed magnetic field of 27 micro Tesla (μT) at a distance D1 of 0.8 meters (m) from the center of the vehicle-side coil (receive coil 302) for LDEV stationary inductive power transfer (IPT), as shown in FIG. 3. Although the 27 μT at a distance of D1 of 0.8 m standard of SAE J2954 is designed for stationary IPT, the 27 µT at a distance D1 of 0.8 m standard may still apply to dIPT systems because the International Commission on Non-Ionizing Radiation Protection (ICNIRP) 2010 standard provides a health protection standard of 27 µT and the 0.8 m criteria is derived from a typical width of a 1.6 m wide LDEV (0.8 is half of 1.6 m, corresponding to the distance from the center of the power transmission coil 110 to a side edge of the wirelessly chargeable vehicle 202).

The use of canceling coils (e.g., the first canceling coil 112 and the second canceling coil 114) to actively cancel electromagnetic radiation from the power transmission coil 110, as discussed in various embodiments herein, may reduce the magnitude of electromagnetic fields at the distance D1 from the center of the receive coil 302. Such reduction may enable compliance with a 27 µT standard at the distance D1 of 0.8 m from the center of the receive coil 302 in high power (e.g., 100 kW to 200 kW or more) wireless power systems.

Figure 4:
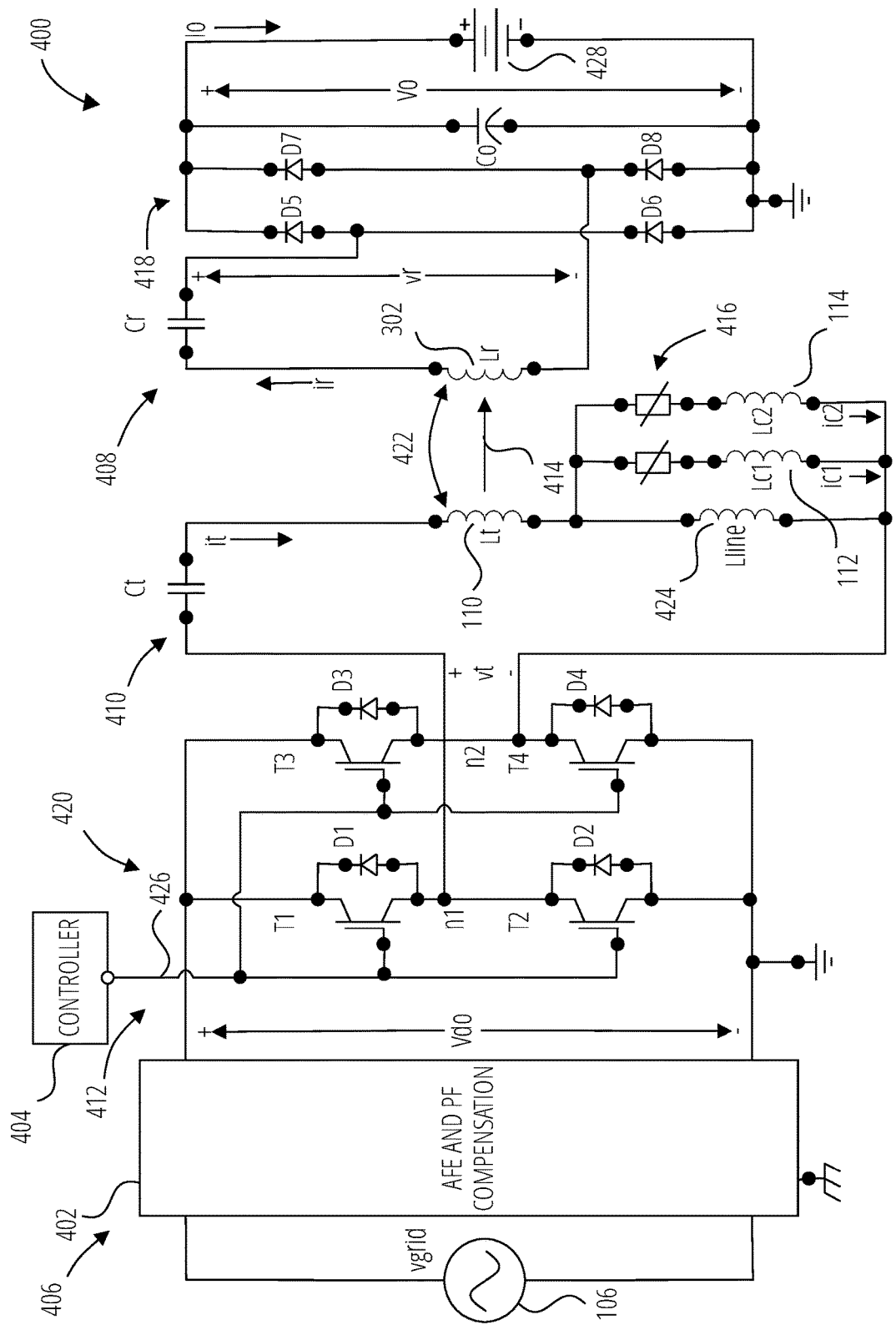
FIG. 4 is a schematic illustration of a wireless power system, according to some embodiments.

FIG. 4 is a schematic illustration of a wireless power system 400, according to some embodiments. The wireless power system 400 includes a transmitter 406 and a receiver 408. The transmitter 406 is configured to transmit wireless power 414 to the receiver 408. The transmitter 406 includes circuitry 412 including an active front end (AFE) and power factor compensation (PC) circuitry (AFE and PF compensation 402), an H-bridge circuit 420, and a resonator circuit 410. The AFE and PF compensation 402 is configured to receive a grid voltage potential $v_{grid}$ from grid power 106 and provide a direct current (DC) voltage potential $V_{do}$, to the H-bridge circuit 420.

The H-bridge circuit 420 includes transistors T1, T2, T3, and T4 and diodes D1, D2, D3, and D4. Diode D1 is electrically connected in parallel across transistor T1, diode D2 is electrically connected in parallel across transistor T2, diode D3 is electrically connected in parallel across transistor T3, and diode D4 is electrically connected in parallel across transistor T4. Switching of the transistors T1, T2, T3, and T4 may be electrically controlled responsive to switch signals 426 (e.g., from a controller 404). By way of non-limiting example, the controller 404 may be configured to operate the H-bridge circuit 420 as an inverter to provide an alternating current voltage potential (transmit voltage potential $v_t$) to the resonator circuit 410. For example, the controller 404 may be configured to switch the transistors T1, T2, T3, and T4 at a select frequency to control a frequency of the transmit voltage potential $v_t$. The H-bridge circuit 420 includes a first node n1 between transistor T1 and transistor T2, and a second node n2 between transistor T3 and transistor T4. The H-bridge circuit 420 is configured to receive the DC voltage potential $V_{do}$, from the AFE and PF compensation 402 and provide, across nodes n1 and n2, a transmit voltage potential $v_t$ to the resonator circuit 410 at a transmit current it.

The resonator circuit 410 includes a transmitter capacitor Ct, the power transmission coil 110 (Lt) connected in series with the transmitter capacitor Ct, the first canceling coil 112 $L_{C1}$ electrically connected in series with the power transmission coil 110, the second canceling coil 114 $L_{C2}$ electrically connected in series with the power transmission coil 110, current controllers 416 configured to control currents $i_{C1}$ and $i_{C2}$ provided to the first canceling coil 112 and the second canceling coil 114, respectively, and a line inductance 424 electrically connected in series with the power transmission coil 110 and in parallel with the first canceling coil 112 and the second canceling coil 114. The resonator circuit 410 is electrically connected between node n1 and node n2 of the H-bridge circuit 420. Accordingly, the resonator circuit 410 is configured to receive the transmit voltage potential $v_t$ and the transmit current it from the H-bridge circuit 420 and provide wireless power 414 from the power transmission coil 110 to a receive coil 302 of the receiver 408 via inductive coupling 422.

The receiver 408 includes the receive coil 302 (Lr), a receiver capacitor Cr, a rectifier circuit 418, and a battery 428 (e.g., a battery of a vehicle). The receiver capacitor Cr is electrically connected between the receive coil 302 and the rectifier circuit 418. The receive coil 302 is configured to receive the wireless power 414 from the power transmission coil 110 and provide a receive current it to the receiver capacitor Cr. The receiver capacitor Cr is configured to provide the receive current it and a receive voltage potential $v_r$ to the rectifier circuit 418. The rectifier circuit 418 includes rectifying diodes D5, D6, D7, and D8 and an output capacitor Co. The rectifying diodes D5, D6, D7, and D8 are electrically connected in a diode bridge arrangement to rectify the receive voltage potential $v_r$ received from the receive coil 302 and the receive capacitor Cr. As a result, the output capacitor Co is configured to smooth a rectified voltage potential provided by the diodes D5, D6, D7, and D8 to provide a DC output voltage potential Vo at an output current Io to the battery 428. As a result, the battery 428 may be charged responsive to the wireless power 414 provided by the transmitter 406 to the receiver 408.

Since the first canceling coil 112 and the second canceling coil 114 are electrically connected in series with the power transmission coil 110, the first canceling coil 112 and the second canceling coil 114 may be excited with currents in an opposite direction to that of a transmit current it of the power transmission coil 110 to cause the first canceling coil 112 and the second canceling coil 114 to generate canceling electromagnetic fields that are 180 degrees out of phase with electromagnetic fields generated by the power transmission coil 110. By way of non-limiting example, the first canceling coil 112 and the second canceling coil 114 may be fed with the canceling currents $i_{C1}$ and $i_{C2}$ at an opposite end of the coils as compared to an end of a the power transmission coil 110 that the transmit current it is fed to.

Also, the current controllers 416 may limit the magnitude of canceling currents $i_{C1}$ and $i_{C2}$ conducted through the first canceling coil 112 and the second canceling coil 114 as compared to a transmit current it conducted through the power transmission coil 110 to reduce the amount of power expended by the first canceling coil 112 and second canceling coil 114 to actively cancel electromagnetic fields generated by the power transmission coil 110. By way of non-limiting example, the current controllers 416 may be configured to limit magnitudes of each of the canceling currents $i_{C1}$ and $i_{C2}$ to substantially six percent (6%) or less of the magnitude of the transmit current it. Since some standards governing operation of wireless charging systems require that transmission of wireless power be 88% efficient, canceling currents $i_{C1}$ and $i_{C2}$ each having magnitudes that are 6% of the magnitude of the transmit current it would press the wireless power system 400 to the limit of an 88% efficiency requirement assuming 100% efficiency otherwise (because two times 6% (6% per canceling coil) is 12%, and 100% minus 12% is the 88% efficiency requirement). Also by way of non-limiting example, the current controllers 416 may be configured to limit magnitudes of the canceling currents $i_{C1}$ and $i_{C2}$ to substantially 2.5% of the transmit current it. In addition, the inductance values of the first canceling coil 112 and the second canceling coil 114 may be adjustable and may be less than an inductance value of the power transmission coil 110 to cause most (e.g., greater than 95%) of the transmit current it to bypass the first canceling coil 112 and the second canceling coil 114 through the power transmission coil 110 and the conducted wire (represented by the line inductance 424). In this way losses due to current passing through the first canceling coil 112 and the second canceling coil 114 may be reduced.

Furthermore, the first canceling coil 112 and the second canceling coil 114 may include fewer turns than the power transmission coil 110. By way of non-limiting example, the first canceling coil 112 and the second canceling coil 114 may each include about one fourth the number of turns (e.g., two turns assuming the power transmission coil 110 includes eight turns) of the power transmission coil 110. Also by way of non-limiting example, the first canceling coil 112 and the second canceling coil 114 may include three turns or less. In addition, the first canceling coil 112 and the second canceling coil 114 may implement smaller Litz wire diameter as compared to that of the power transmission coil 110.

In some embodiments, a size of the first canceling coil 112 and the second canceling coil 114 may be less than a size of the power transmission coil 110. By way of non-limiting example, the size of the first canceling coil 112 and the second canceling coil 114 may be about fifty percent (50%) or less than a size of the power transmission coil 110.

In some embodiments, shapes of the first canceling coil 112 and the second canceling coil 114 may be at least substantially the same as that of the power transmission coil 110 (e.g., scaled-down versions of the shape of the power transmission coil 110). By way of non-limiting example, the power transmission coil 110, the first canceling coil 112, and the second canceling coil 114 may all be shaped as double-D coils. In some embodiments, however, one or more of the first canceling coil 112 and the second canceling coil 114 may have shapes that are different from that of the power transmission coil 110.

When one of the wirelessly chargeable vehicles 116 passes by one of the wireless power transmitters 108 (e.g., the transmitter 406), the highest transferred wireless power 414 will be received by the receiver 408 of the vehicle when the receive coil 302 and the power transmission coil 110 are substantially aligned. Considering only the safety of a driver of the vehicle, the fully aligned situation is considered as the worst case because of the highest magnitude receive current it received. It is noted that some misaligned scenarios might lead to higher electromagnetic emissions near the power transmission coil 110.

Figure 5:
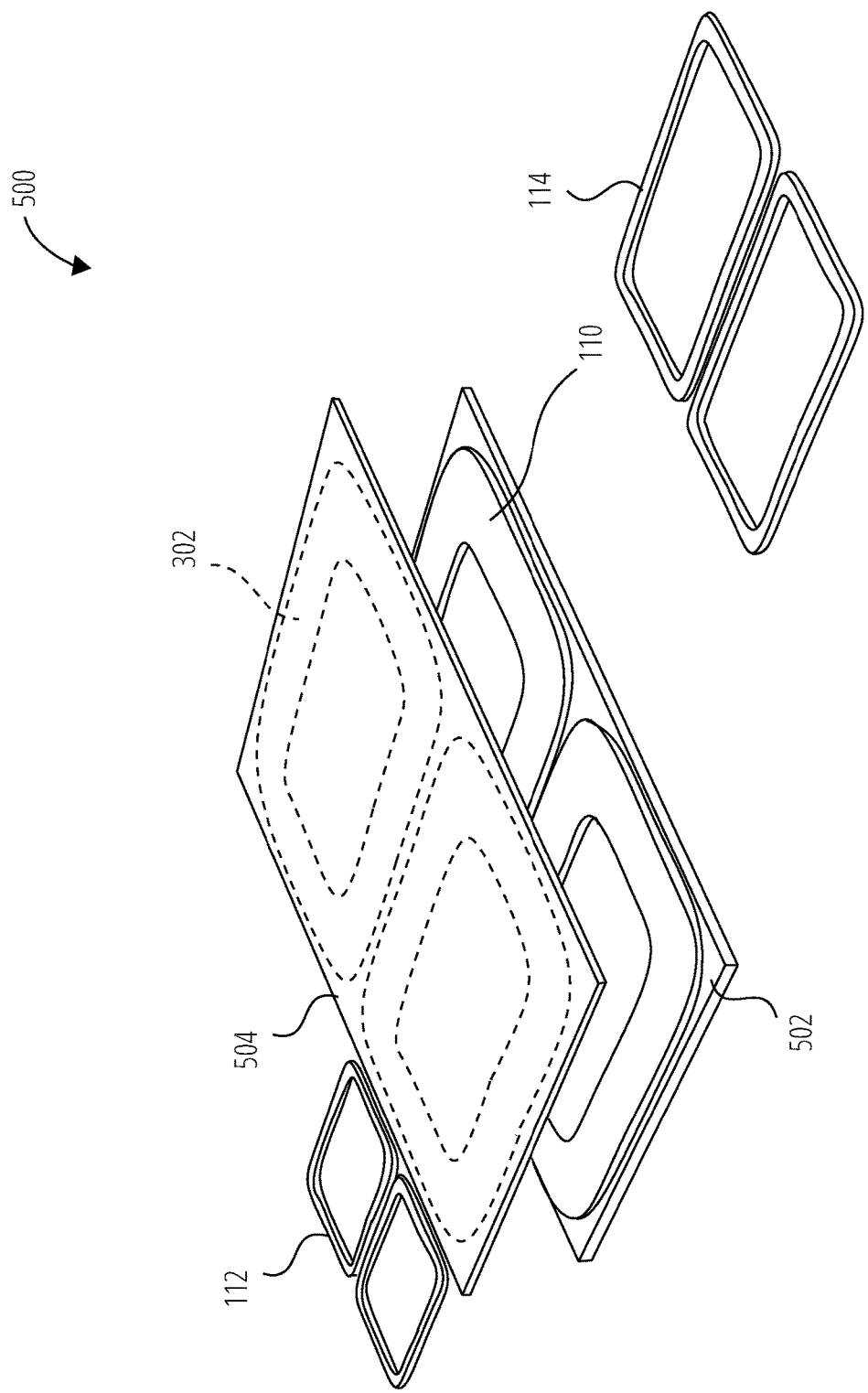
FIG. 5 is a perspective view of examples of coils of the wireless power system of FIG. 4.

FIG. 5 is a perspective view of examples of coils 500 of the wireless power system 400 of FIG. 4. The coils 500 include the power transmission coil 110, the first canceling coil 112, the second canceling coil 114, and the receive coil 302 of FIG. 4. FIG. 5 also illustrates a transmitter ferrite back shield 502 behind the power transmission coil 110 and a receiver ferrite back shield 504 behind the receive coil 302. The transmitter ferrite back shield 502 and the receiver ferrite back shield 504 are configured to provide passive shielding to electromagnetic fields generated by the power transmission coil 110 and the receive coil 302. As previously discussed, the first canceling coil 112 and the second canceling coil 114 are configured to provide active shielding to the electromagnetic fields generated by the power transmission coil 110 and the receive coil 302.

As may be observed in the example of FIG. 5, the power transmission coil 110, the receive coil 302, the first canceling coil 112, and the second canceling coil 114 are each implemented as double D shaped coils. Accordingly, the first canceling coil 112 and the second canceling coil 114 are of the same shape as the power transmission coil 110, but of a smaller size than the power transmission coil 110.

As also previously discussed, the canceling flowing in the first canceling coil 112 and the second canceling coil 114 are 180 degrees opposite to the transmit current it flowing in the power transmission coil 110. To actively control the spray magnetic field and minimize the losses in the power transmission coil 110, currents flowing through the first canceling coil 112 and the second canceling coil 114 are adjusted (e.g., using the current controllers 416 of FIG. 4) to be very low. Also, two canceling coils (first canceling coil 112 and second canceling coil 114) are installed on two sides of the power transmission coil 110 with relatively large horizontal gap distances (e.g., substantially 0.4 meters or more) between the power transmission coil 110 and each of the first canceling coil 112 and the second canceling coil 114 so that the canceling coils and the power transmission coil 110 are decoupled, which would reduce the impact of the first canceling coil 112 and the second canceling coil 114 on a coupling factor between the power transmission coil 110 and the receive coil 302. The transmitter capacitor Ct (FIG. 4) may be tuned to compensate for inductances $L_{C1}$ and $L_{C2}$ of the first canceling coil 112 and the second canceling coil 114, respectively.

Although not shown, in some embodiments, a wireless power receiver may include canceling coils, similar to those of the wireless power transmitters disclosed herein. It should be noted, however, that in order to space centers of canceling coils 0.4 meters from a center of a receive coil, a relatively wide vehicle (e.g., a heavy-duty electric vehicle) may be used to provide sufficient space under the vehicle for the receive coil and the canceling coils.

Figure 6:
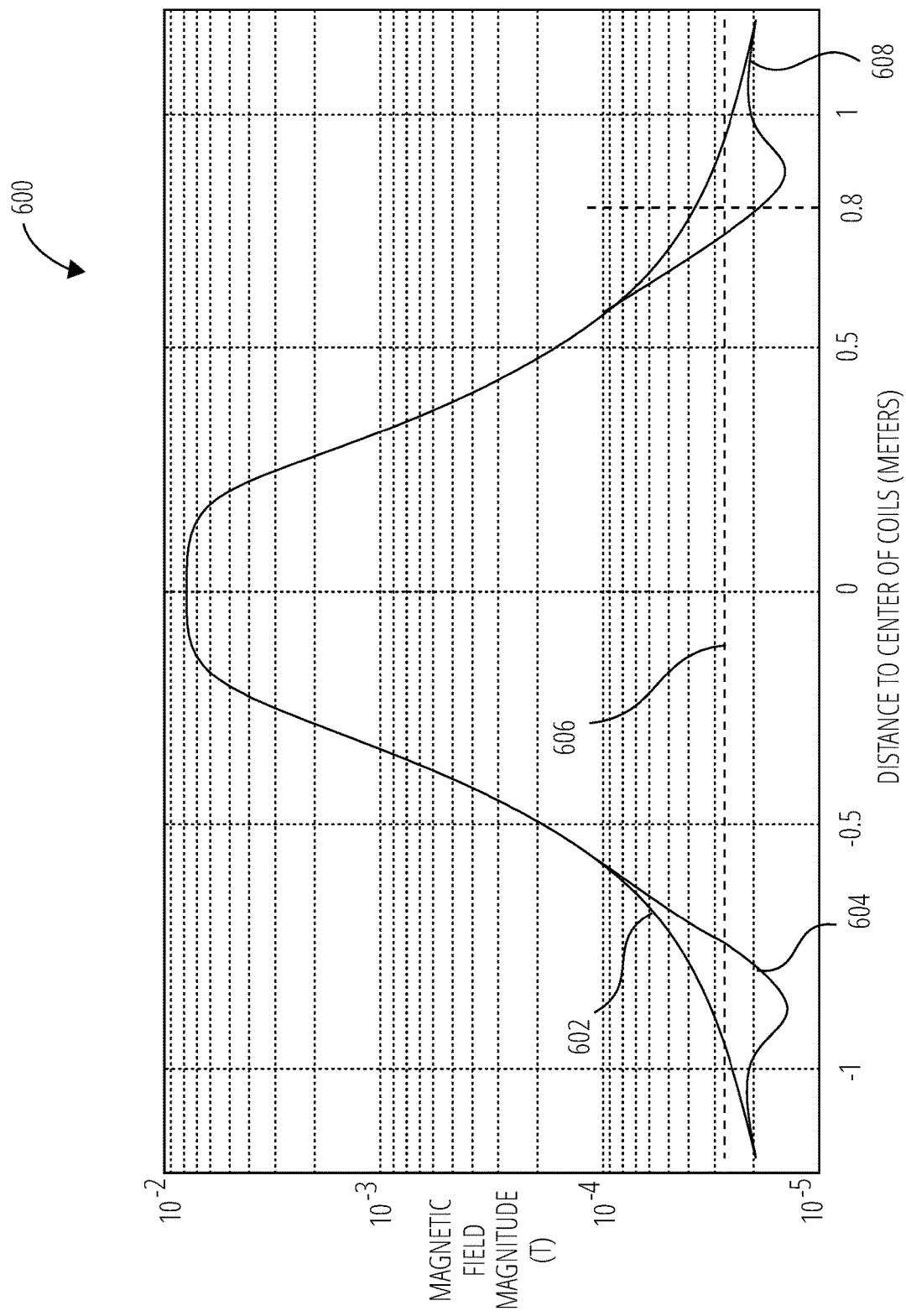
FIG. 6 is a plot illustrating an impact of canceling coils according to embodiments of the disclosure on electromagnetic fields in a 100 kW wireless power system, such as the wireless power system of FIG. 3 and the wireless power system of FIG. 4.

FIG. 6 is a plot 600 illustrating an impact of canceling coils according to embodiments of the disclosure on electromagnetic fields in a 100 kW wireless power system (e.g., the wireless power system 300 of FIG. 3 or the wireless power system 400 of FIG. 4). As a typical example of a high-power IPT system, a 100 kilo Watt (kW) IPT system was simulated to observe the impact of the first canceling coil 112 and the second canceling coil 114 on electromagnetic fields generated by the power transmission coil 110 and the first canceling coil 112. Two canceling coils (first canceling coil 112 and second canceling coil 114) were simulated at two sides of a power transmission coil 110 with centers of the canceling coils at a distance of 0.8 meters from the center of the power transmission coil 110. To minimize the impact of the canceling coils on the power transmission coil 110 in terms of efficiency reduction, the first canceling coil 112 and the second canceling coil 114 were simulated as only having two turns each. Also, canceling currents (e.g., $i_{C1}$ and $i_{C2}$ of FIG. 4) with magnitudes of 4.275 amperes (A) were simulated, which is only about 2.5% of the transmit current (e.g., it of FIG. 4) simulated in the power transmission coil 110. Table 1 summarizes the parameters of the simulation.

TABLE 1

Simulation Parameters

| Symbol | Parameter | Value |
|---|---|---|
| $N_C$ | Number of canceling coil turns | 2 |
| $i_{c1}$, $i_{c2}$ | Canceling currents | 4.275 A |
| N/A | Canceling coil type | DD |
| $f$ | Resonant frequency (of resonator circuit 410) | 22 kHz |
| $P_{out}$ | Output power | 100 kW |
| $i_t$ | Transmit current | 177 A |

TABLE 1-continued

Simulation Parameters

| Symbol | Parameter | Value |
|---|---|---|
| $i_r$ | Receive current | 171 A |
| N | Number of turns of power transmission coil | 8 |
| N/A | Transmit and receive coil type | DD |
| N/A | Passive shield of transmit and receive coils | Backing ferrite |

The plot 600 includes simulated magnetic field magnitudes as a function of distance from a center of the power transmission coil 110 and the receive coil 302 (which are simulated as perfectly aligned) both with canceling coils and without canceling coils. Accordingly, the plot 600 includes without canceling coils magnetic field 602 and with canceling coils magnetic field 604. The plot 600 also illustrates a 27 µT level 606 associated with a 27 µT at 0.8 m from the center of the power transmission coil 110 requirement, as mandated by ICNIRP 2010. The with canceling coils magnetic field 604 is preliminarily verified by a magnetic field measurement 608 at a 1.1-m distance with IPT operated at 100 kW.

As illustrated in the plot 600, the with canceling coils magnetic field 604 is about 18.2 µT 0.8 m from the center of the coil, as compared to about 37.2 µT of the without canceling coils magnetic field 602 at 0.8 m. Accordingly, the canceling coils are shown in the plot 600 to reduce magnetic field emission from 37.2 µT to 18.2 µT at a 0.8-m distance from the center of the power transmission coil 110. Also, all magnetic field emission levels of the with canceling coils magnetic field 604 over 0.8 m are below the 27 µT requirement mandated by ICNIRP 2010. Since only 2.5% of the transmit current it of the power transmission coil 110 is flowing in the canceling coils, the downside of applying active canceling coils in terms of increasing coil losses is acceptable.

Figure 7:
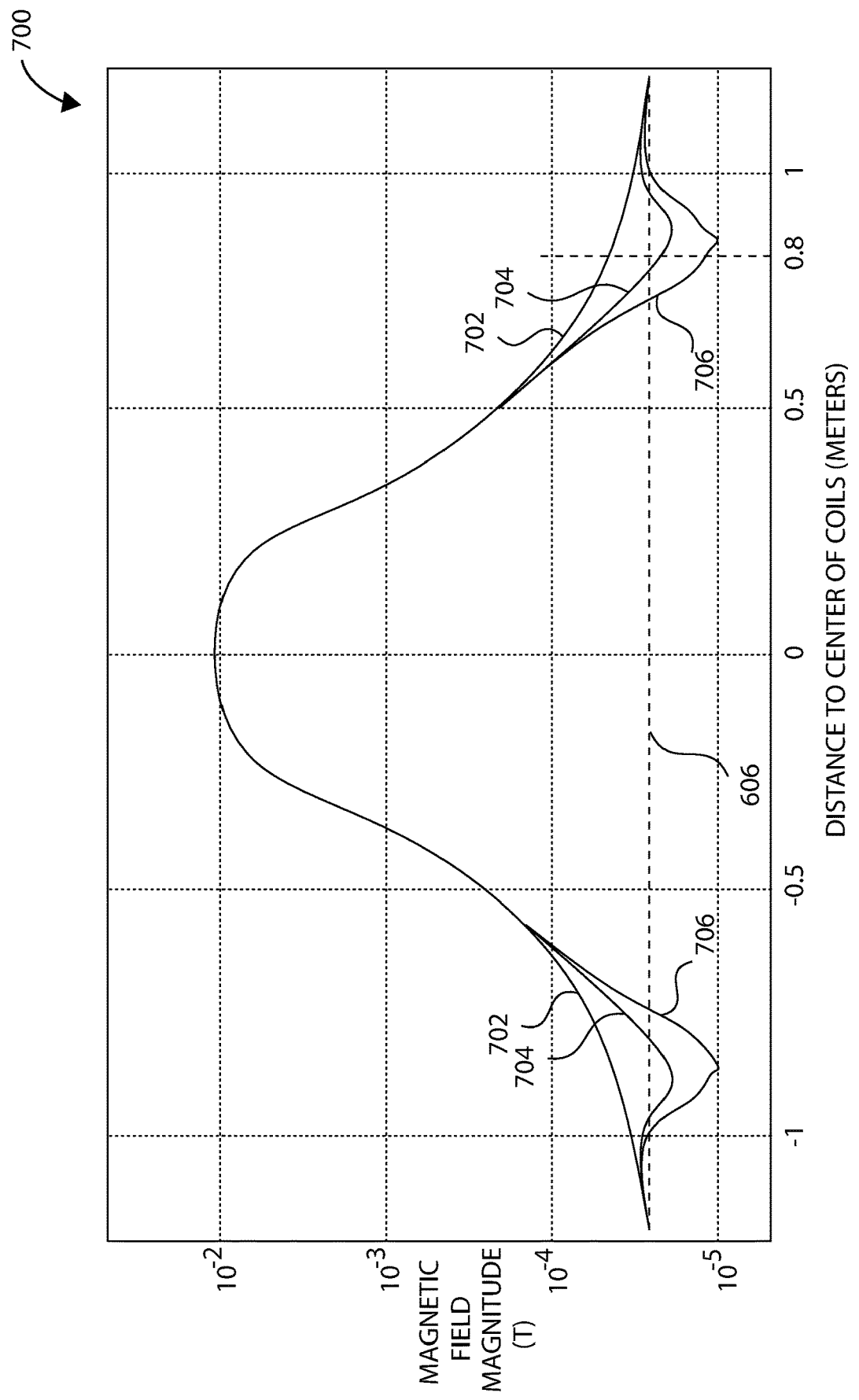
FIG. 7 is a plot illustrating an impact of canceling coils according to embodiments of the disclosure on electromagnetic fields in a 200 kW wireless power system, such as the wireless power system of FIG. 3 and the wireless power system of FIG. 4.

FIG. 7 is a plot 700 illustrating an impact of canceling coils according to embodiments of the disclosure on electromagnetic fields in a 200 kW wireless power system (e.g., the wireless power system 300 of FIG. 3 or the wireless power system 400 of FIG. 4). A similar simulation to that of FIG. 6 was conducted using a 200 kW wireless power system and with different canceling-coil currents. For example, the plot 700 includes a no canceling coil magnetic field 702, a 2.5% canceling current magnetic field 704, and a 4% canceling current magnetic field 706. The no canceling coil magnetic field 702 is a magnetic field magnitude plotted against side-to-side distances from the center of the power transmission coil 110 without the first canceling coil 112 and the second canceling coil 114. The 2.5% magnetic field current 704 is a magnetic field magnitude plotted against side-to-side distances from the center of the power transmission coil 110 while a current provided to the first canceling coil 112 and the second canceling coil 114 is 2.5% of that of the current provided to the power transmission coil. Likewise, the 4% magnetic field current 706 is a magnetic field magnitude plotted against side-to-side distances from the center of the power transmission coil 110 while a current provided to the first canceling coil 112 and the second canceling coil 114 is 4% of that of the current provided to the power transmission coil. FIG. 7 also illustrates the 27 µT level 606 associated with a 27 µT at 0.8 m from the center of the power transmission coil 110 requirement, as mandated by ICNIRP 2010.

It is observed that the field emission around 0.8 m from the center of the power transmission coil 110 can be limited to less than the 27 µT level 606 in 200 kW operation by adjusting the currents in the first canceling coil 112 and the second canceling coil 114. With canceling-coil currents increasing from no canceling current (no canceling coil magnetic field 702) to 2.5% of power transmission coil 110 cancelling current (2.5% canceling current magnetic field 704) to 4% of transmission coil canceling current (4% canceling current magnetic field 706), the EM field at 0.8 m drops significantly from 53.2 µT to 25.8 µT to 13.1 µT, respectively, at 0.8 meters from the center of the power transmission coil 110.

Figure 8:
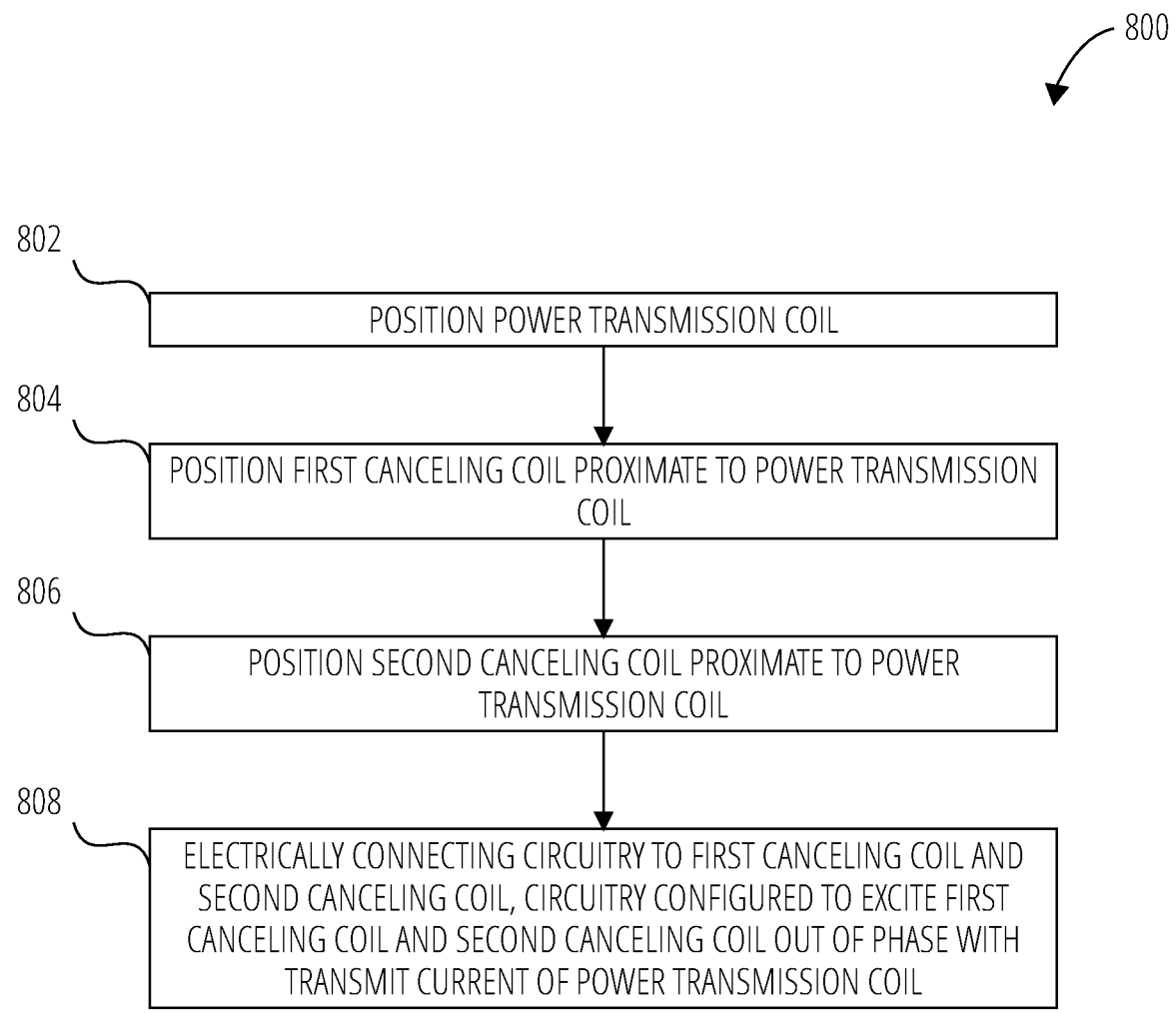
FIG. 8 is a flowchart illustrating a method of assembling a wireless power transmitter, according to some embodiments.

FIG. 8 is a flowchart illustrating a method 800 of assembling a wireless power transmitter, according to some embodiments. At operation 802, the method 800 includes positioning a power transmission coil. At operation 804, the method 800 includes positioning a first canceling coil proximate to the power transmission coil. At operation 806, the method 800 includes positioning a second canceling coil proximate to the power transmission coil. By way of non-limiting example, centers of the first canceling coil and the second canceling coil may be positioned substantially 0.4 m or more from a center of the power transmission coil.

At operation 808, method 800 includes electrically connecting circuitry to the first canceling coil and the second canceling coil. The circuitry is configured to excite the first canceling coil and the second canceling coil out of phase with a transmit current of the power transmission coil. By way of non-limiting example, the circuitry may be configured to excite the first canceling coil and the second canceling coil 180 degrees out of phase with the transmit current of the power transmission coil.

Figure 9:
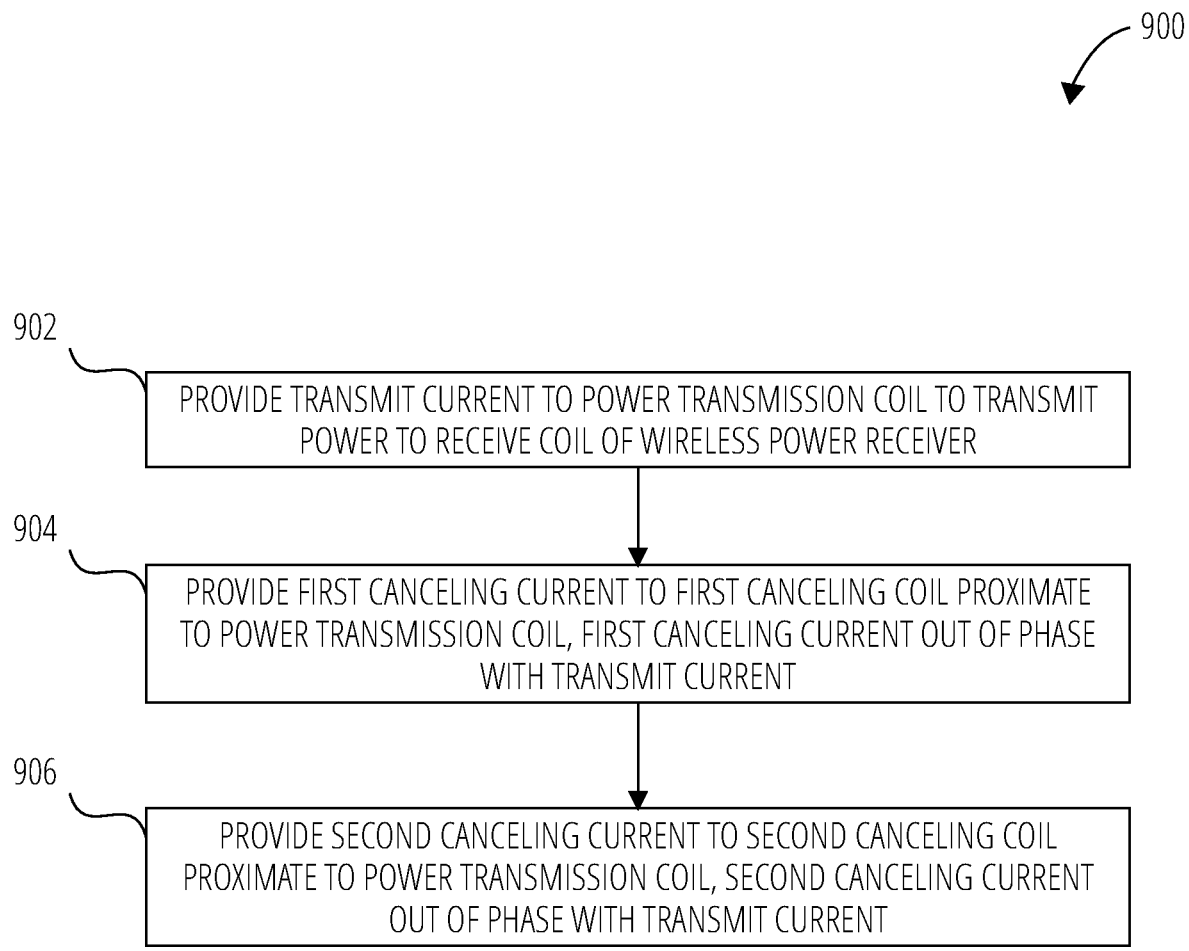
FIG. 9 is a flowchart illustrating a method of operating a wireless power transmitter, according to some embodiments.

FIG. 9 is a flowchart illustrating a method 900 of operating a wireless power transmitter, according to some embodiments. At operation 902, the method 900 includes providing a transmit current to a power transmission coil to transmit power to a receive coil of a wireless power receiver. At operation 904, the method 900 includes providing a first canceling current to a first canceling coil proximate to the power transmission coil. The first canceling current is out of phase with the transmit current. At operation 906, the method 900 includes providing a second canceling current to a second canceling coil proximate to the power transmission coil. The second canceling current is out of phase with the transmit current.

EXAMPLES

A non-exhaustive, non-limiting list of example embodiments follows. Not each of the example embodiments listed below is explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A wireless power transmitter, comprising: a first canceling coil offset from a power transmission coil; a second canceling coil offset from the power transmission coil; and circuitry electrically connected to the first canceling coil and the second canceling coil, the circuitry configured to deliver canceling currents to the first canceling coil and the second canceling coil to destructively interfere with portions of electromagnetic fields generated by the power transmission coil.

Example 2: The wireless power transmitter of Example 1, wherein magnitudes of the canceling currents for each of the first canceling coil and the second canceling coil are less than or equal to six percent (6%) of a magnitude of a transmit current provided to the power transmission coil.

Example 3: The wireless power transmitter according to any one of Examples 1 and 2, wherein numbers of turns of the first canceling coil and the second canceling coil are less than a number of turns of the power transmission coil.

Example 4: The wireless power transmitter of Example 3, wherein the numbers of turns of the first canceling coil and the second canceling coil are substantially one quarter of the number of turns of the power transmission coil.

Example 5: The wireless power transmitter according to any one of Examples 3 and 4, wherein the numbers of turns of the first canceling coil and the second canceling coil are less than or equal to three turns.

Example 6: The wireless power transmitter according to any one of Examples 1-5, wherein the first canceling coil and the second canceling coil are electrically connected in series with the power transmission coil and in parallel with each other.

Example 7: The wireless power transmitter of Example 6, wherein the circuitry includes current controllers electrically connected between the power transmission coil and the first canceling coil and the second canceling coil, the current controllers configured to reduce the canceling currents delivered to the first canceling coil and the second canceling coil as compared to a transmit current provided to the power transmission coil.

Example 8: The wireless power transmitter according to any one of Examples 1-7, wherein sizes of the first canceling coil and the second canceling coil are less than a size of the power transmission coil.

Example 9: The wireless power transmitter of Example 8, wherein the sizes of the first canceling coil and the second canceling coil are less than or equal to fifty percent (50%) of the size of the power transmission coil.

Example 10: The wireless power transmitter according to any one of Examples 1-9, wherein at least one of the first canceling coil and the second canceling coil has at least substantially a same shape as a shape of the transmit coil.

Example 11: The wireless power transmitter according to any one of Examples 1-10, wherein centers of the first canceling coil and the second canceling coil are positioned at least 0.4 meters from a center of the power transmission coil.

Example 12: The wireless power transmitter of Example 11, wherein the centers of the first canceling coil and the second canceling coil are positioned substantially 0.8 meters from the center of the power transmission coil.

Example 13: The wireless power transmitter according to any one of Examples 1-9, 11, and 12, wherein at least one of the first canceling coil and the second canceling coil has a shape that is different from a shape of the power transmission coil.

Example 14: An electrified roadway system, comprising: a plurality of wireless power transmitters, each wireless power transmitter of the plurality of wireless power transmitters including: a power transmission coil configured to inductively couple to and provide wireless power to receive coils of wirelessly chargeable vehicles; and a plurality of canceling coils configured to generate canceling electromagnetic fields to destructively interfere with portions of electromagnetic fields generated by the power transmission coil.

Example 15: The electrified roadway system of Example 14, wherein the plurality of canceling coils comprises a first canceling coil spaced laterally from the power transmission coil and a second canceling coil spaced laterally from the power transmission coil opposite from first canceling coil across the power transmission coil.

Example 16: The electrified roadway system according to any one of Examples 14 and 15, wherein a number of coils of the plurality of canceling coils is an even number of canceling coils.

Example 17: The electrified roadway system of Example 16, wherein the number of coils of the plurality of canceling coils is four (4).

Example 18: The electrified roadway system according to any one of Examples 14-17, wherein each of the plurality of canceling coils is excited with a canceling current of an opposite direction as compared to a transmitter current of the power transmission coil.

Example 19: A method of assembling a wireless power transmitter, the method comprising: positioning a power transmission coil; positioning a first canceling coil proximate to the power transmission coil; positioning a second canceling coil proximate to the power transmission coil; and electrically connecting circuitry to the first canceling coil and the second canceling coil, the circuitry configured to excite the first canceling coil and the second canceling coil out of phase with a transmit current of the power transmission coil.

Example 20: The method of Example 19, wherein electrically connecting circuitry to the first canceling coil and the second canceling coil comprises electrically connecting the first canceling coil and the second canceling coil in series with the power transmission coil.

Example 21: The method of Example 20, wherein electrically connecting the first canceling coil and the second canceling coil in series with the power transmission coil comprises electrically connecting current controllers between the power transmission coil and the first canceling coil and the second canceling coil, the current controllers configured to reduce magnitudes of canceling currents provided to the first canceling coil and the second canceling coil with respect to a transmit current of the power transmission coil.

Example 22: The method according to any one of Examples 20 and 21, wherein electrically connecting the first canceling coil and the second canceling coil in series with the power transmission coil comprises electrically connecting the first canceling coil and the second canceling coil in parallel with each other.

Example 23: The method according to any one of Examples 19-22, wherein positioning the power transmission coil, the first canceling coil, and the second canceling coil comprises positioning the power transmission coil, the first canceling coil, and the second canceling coil beneath a surface of an electrified roadway.

Example 24: The method according to any one of Examples 19-23, further comprising positioning a ferrite back shield behind the power transmission coil.

Example 25: A method of operating a wireless power transmitter, the method comprising: providing a transmit current to a power transmission coil to transmit power to a receive coil of a wireless power receiver; providing a first canceling current to a first canceling coil laterally offset from the power transmission coil, the first canceling current out of phase with the transmit current; and providing a second canceling current to a second canceling coil laterally offset from the power transmission coil, the second canceling current out of phase with the transmit current.

Example 26: The method of Example 25, wherein providing a first canceling current and a second canceling current out of phase with the transmit current comprises providing the first canceling current and the second canceling current substantially one hundred and eighty degrees out of phase with the transmit current.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A wireless power transmitter, comprising:
   a first canceling coil laterally offset from a power transmission coil on a first side thereof;
   a second canceling coil laterally offset from the power transmission coil on a second side thereof, the second side opposite the first side, centers of the first canceling coil and the second canceling coil positioned a gap distance from a center of the power transmission coil to decouple the first canceling coil and the second canceling coil from the power transmission coil; and
   circuitry electrically connected to the power transmission coil, the first canceling coil, and the second canceling coil, the first canceling coil and the second canceling coil electrically connected in series with the power transmission coil and in parallel with each other, the circuitry configured to provide a transmit current to the power transmission coil to generate electromagnetic fields for wireless charging, the transmit current to excite canceling currents in the first canceling coil and the second canceling coil in an opposite direction to that of the transmit current to generate canceling electromagnetic fields to destructively interfere with portions of the electromagnetic fields generated by the power transmission coil.

2. The wireless power transmitter of claim 1, wherein magnitudes of the canceling currents for each of the first canceling coil and the second canceling coil are less than or equal to six percent (6%) of a magnitude of the transmit current provided to the power transmission coil.

3. The wireless power transmitter of claim 1, wherein numbers of turns of the first canceling coil and the second canceling coil are less than a number of turns of the power transmission coil.

4. The wireless power transmitter of claim 3, wherein the numbers of turns of the first canceling coil and the second canceling coil are substantially one quarter of the number of turns of the power transmission coil.

5. The wireless power transmitter of claim 3, wherein the numbers of turns of the first canceling coil and the second canceling coil are less than or equal to three turns.

6. The wireless power transmitter of claim 1, wherein the circuitry comprises a line inductance electrically connected in series with the power transmission coil and in parallel with the first canceling coil and the second canceling coil.

7. The wireless power transmitter of claim 1, wherein the circuitry includes current controllers electrically connected between the power transmission coil and the first canceling coil and the second canceling coil, the current controllers configured to reduce the canceling currents delivered to the first canceling coil and the second canceling coil as compared to the transmit current provided to the power transmission coil.

8. The wireless power transmitter of claim 1, wherein sizes of the first canceling coil and the second canceling coil are less than a size of the power transmission coil.

9. The wireless power transmitter of claim 8, wherein the sizes of the first canceling coil and the second canceling coil are less than or equal to fifty percent (50%) of the size of the power transmission coil.

10. The wireless power transmitter of claim 1, wherein at least one of the first canceling coil and the second canceling coil has at least substantially a same shape as a shape of the power transmission coil, the shape of the power transmission coil comprising a double-D shape.

11. The wireless power transmitter of claim 1, wherein the gap distance is 0.8 meters or more.

12. The wireless power transmitter of claim 1, wherein the gap distance is substantially 0.8 meters to reduce the electromagnetic fields of the power transmission coil to be below a predetermined requirement at substantially 0.8 meters from the center of the power transmission coil.

13. The wireless power transmitter of claim 7, wherein the current controllers are configured to reduce magnitudes of the canceling currents for each of the first canceling coil and the second canceling coil to be less than or equal to six percent (6%) of a magnitude of the transmit current provided to the power transmission coil.

14. An electrified roadway system, comprising:
  a plurality of wireless power transmitters, each wireless power transmitter of the plurality of wireless power transmitters including:
    a power transmission coil configured to inductively couple to and provide wireless power to receive coils of wirelessly chargeable vehicles;
    a plurality of canceling coils including a first canceling coil and a second canceling coil, the first canceling coil and the second canceling coil electrically connected in series with the power transmission coil and in parallel with each other, centers of the first canceling coil and the second canceling coil positioned a gap distance from a center of the power transmission coil to decouple the first canceling coil and the second canceling coil from the power transmission coil; and
    circuitry electrically connected to the power transmission coil, the first canceling coil, and the second canceling coil, the circuitry configured to provide a transmit current to the power transmission coil to generate electromagnetic fields for wireless charging, the transmit current to excite canceling currents in the first canceling coil and the second canceling coil in an opposite direction to that of the transmit current to generate canceling electromagnetic fields to destructively interfere with portions of the electromagnetic fields generated by the power transmission coil.

15. The electrified roadway system of claim 14, wherein the first canceling coil is spaced laterally from the power transmission coil and the second canceling coil is spaced laterally from the power transmission coil opposite from the first canceling coil across the power transmission coil.

16. The electrified roadway system of claim 14, wherein the circuitry comprises a line inductance electrically connected in series with the power transmission coil and in parallel with the first canceling coil and the second canceling coil, such that most of the transmit current bypasses the first canceling coil and the second canceling coil through the power transmission coil and the line inductance.

17. A method of assembling a wireless power transmitter, the method comprising:
  positioning a power transmission coil;
  positioning a first canceling coil to be laterally offset from the power transmission coil on a first side thereof, a center of the first canceling coil positioned a gap distance from a center of the power transmission coil to decouple the first canceling coil from the power transmission coil;
  positioning a second canceling coil to be laterally offset from the power transmission coil on a second side thereof, the second side opposite the first side, a center of the second canceling coil positioned the gap distance from the center of the power transmission coil to decouple the second canceling coil from the power transmission coil; and
  electrically connecting circuitry to the power transmission coil, the first canceling coil, and the second canceling coil, the first canceling coil and the second canceling coil electrically connected in series with the power transmission coil and in parallel with each other, the circuitry configured to provide a transmit current to the power transmission coil to generate electromagnetic fields for wireless charging, the transmit current to excite the first canceling coil and the second canceling coil with canceling currents that are out of phase with the transmit current of the power transmission coil to generate canceling electromagnetic fields to destructively interfere with portions of the electromagnetic fields generated by the power transmission coil.

18. The method of claim 17, wherein positioning the power transmission coil, the first canceling coil, and the second canceling coil comprises positioning the power transmission coil, the first canceling coil, and the second canceling coil beneath a surface of an electrified roadway.

19. A method comprising:
  at a wireless power transmitter comprising a power transmission coil, a first canceling coil, and a second canceling coil, the first canceling coil and the second canceling coil electrically connected in parallel with each other, the parallel-connected first and second canceling coils electrically connected in series with the power transmission coil, providing a transmit current to the power transmission coil to transmit power to a receive coil of a wireless power receiver;
  exciting the first canceling coil with a first canceling current responsive to the transmit current, the first canceling current out of phase with the transmit current, the first canceling coil laterally offset from the power transmission coil on a first side thereof, a center of the first canceling coil positioned a gap distance from a center of the power transmission coil to decouple the first canceling coil from the power transmission coil; and
  exciting the second canceling coil with a second canceling current responsive to the transmit current, the second canceling current out of phase with the transmit current, the second canceling coil laterally offset from the power transmission coil on a second side thereof, the second side opposite the first side, a center of the second canceling coil positioned the gap distance from the center of the power transmission coil to decouple the second canceling coil from the power transmission coil.

20. The method of claim 19, wherein exciting the first canceling coil with the first canceling current and exciting the second canceling coil with the second canceling current comprises providing the first canceling current and the second canceling current substantially one hundred and eighty degrees out of phase with the transmit current.

* * * * *

UNITED STATES PATENT AND TRADEMARK OFFICE
CERTIFICATE OF CORRECTION

| | |
|---|---|
| PATENT NO. | : 12,149,096 B2 |
| APPLICATION NO. | : 17/753533 |
| DATED | : November 19, 2024 |
| INVENTOR(S) | : Bo Zhang |

Page 1 of 1

It is certified that error appears in the above-identified patent and that said Letters Patent is hereby corrected as shown below:

In the Specification

| | | |
|---|---|---|
| Column 7, | Lines 30-31, | change "potential $V_{do}$, to the" to --potential $V_{do}$ to the-- |
| Column 7, | Line 51, | change "potential $V_{do}$, from" to --potential $V_{do}$ from-- |
| Column 7, | Line 54, | change "transmit current it." to --transmit current $i_t$.-- |
| Column 8, | Line 3, | change "current it from the" to --current $i_t$ from the-- |
| Column 8, | Line 13, | change "receive current it to the receiver" to --receive current $i_r$ to the receiver-- |
| Column 8, | Line 15, | change "current it and a receive" to --current $i_r$ and a receive-- |
| Column 8, | Line 32, | change "current it of the power" to --current $i_t$ of the power-- |
| Column 8, | Line 41, | change "current it is fed to." to --current $i_t$ is fed to.-- |
| Column 8, | Line 45, | change "current it conducted through" to --current $i_t$ conducted through-- |
| Column 8, | Line 53, | change "current it. Since some" to --current $i_t$. Since some-- |
| Column 8, | Lines 57-58, | change "current it would press" to --current $i_t$ would press-- |
| Column 8, | Line 65, | change "current it. In addition," to --current $i_t$. In addition,-- |
| Column 9, | Line 2, | change "current it to bypass" to --current $i_t$ to bypass-- |
| Column 9, | Lines 44-45, | change "current it received." to --current $i_r$ received.-- |
| Column 10, | Line 5, | change "current it flowing" to --current $i_t$ flowing-- |
| Column 11, | Line 34, | change "current it of the power" to --current $i_t$ of the power-- |

Signed and Sealed this
Twenty-fifth Day of February, 2025

Coke Morgan Stewart
*Acting Director of the United States Patent and Trademark Office*